(12) United States Patent
Hamilton

(10) Patent No.: US 9,749,132 B1
(45) Date of Patent: Aug. 29, 2017

(54) SYSTEM AND METHOD FOR SECURE DELETION OF DATA

(75) Inventor: James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 39 days.

(21) Appl. No.: 13/305,340

(22) Filed: Nov. 28, 2011

(51) Int. Cl.
*H04L 29/06* (2006.01)
*H04L 9/08* (2006.01)
*G06F 21/10* (2013.01)

(52) U.S. Cl.
CPC .......... *H04L 9/0869* (2013.01); *G06F 21/10* (2013.01)

(58) Field of Classification Search
CPC .............................. H04L 9/0869; G06F 21/10
USPC ........ 380/44, 46; 713/193; 726/30; 707/741, 707/827, 830
See application file for complete search history.

(56) References Cited

U.S. PATENT DOCUMENTS

| | | | |
|---|---|---|---|
| 5,265,159 A * | 11/1993 | Kung | 713/193 |
| 5,860,136 A * | 1/1999 | Fenner | H03M 7/4006 370/396 |
| 7,275,139 B1 * | 9/2007 | Tormasov | G06F 3/0623 711/159 |
| 7,584,198 B2 * | 9/2009 | Slade | |
| 7,653,668 B1 * | 1/2010 | Shelat | G06F 11/2094 707/610 |
| 7,904,732 B2 * | 3/2011 | Cui et al. | 713/193 |
| 8,266,430 B1 * | 9/2012 | Lumb | G06F 21/62 713/165 |
| 8,510,846 B1 * | 8/2013 | Gunnarson et al. | 726/26 |
| 8,528,101 B1 * | 9/2013 | Miller et al. | 726/26 |
| 2005/0226420 A1 * | 10/2005 | Makela et al. | 380/270 |
| 2006/0143476 A1 * | 6/2006 | McGovern | G06F 21/6218 713/191 |
| 2007/0038857 A1 * | 2/2007 | Gosnell | G06F 17/30067 713/165 |
| 2008/0177802 A1 | 7/2008 | Haye et al. | |
| 2008/0271156 A1 * | 10/2008 | Lipinski et al. | 726/27 |
| 2009/0049310 A1 * | 2/2009 | Carlson et al. | 713/193 |
| 2009/0049311 A1 * | 2/2009 | Carlson et al. | 713/193 |
| 2009/0063394 A1 * | 3/2009 | Cox | G06F 17/30336 |
| 2009/0172265 A1 | 7/2009 | Park et al. | |
| 2009/0196417 A1 | 8/2009 | Beaver et al. | |

(Continued)

OTHER PUBLICATIONS

Pecherle, George; Gyorodi, Cornelia; Gyorodi, Robert; Andronic, Bogdan; Ignat, Iosif; "New Method of Detection and Wiping of Sensitive Information", IEEE International Conference on Intelligent Computer Communication and Processing, Aug. 25-27, 2011, pp. 145-148.*

(Continued)

*Primary Examiner* — Victor Lesniewski
(74) *Attorney, Agent, or Firm* — Robert C. Kowert; Meyertons, Hood, Kivlin, Kowert & Goetzel, P.C.

(57) ABSTRACT

Systems and methods for secure deletion of data items in a storage system may support the deletion of stored data item. In response to a storage request, a storage manager may generate a key corresponding to the data item to be stored and encrypt the data item before storing the data item in a data store. The key may be stored in an index comprising metadata corresponding to the data item. In response to a delete request, the storage system may determine the corresponding metadata entry in the index and remove the key corresponding to the data item without accessing the data item.

27 Claims, 5 Drawing Sheets

(56) References Cited

U.S. PATENT DOCUMENTS

| | | | |
|---|---|---|---|
| 2009/0300069 A1* | 12/2009 | O'Sullivan | 707/200 |
| 2010/0082630 A1* | 4/2010 | Zagelow et al. | 707/741 |
| 2010/0169661 A1* | 7/2010 | Summers | G06F 21/72 |
| | | | 713/189 |
| 2010/0169662 A1* | 7/2010 | Summers | G06F 21/80 |
| | | | 713/189 |
| 2010/0199042 A1* | 8/2010 | Bates | H04L 67/289 |
| | | | 711/114 |
| 2010/0299490 A1* | 11/2010 | Attarde et al. | 711/162 |
| 2010/0332401 A1* | 12/2010 | Prahlad | G06F 17/3002 |
| | | | 705/80 |
| 2011/0191838 A1* | 8/2011 | Yanagihara | G06F 15/16 |
| | | | 726/7 |
| 2011/0238716 A1* | 9/2011 | Amir et al. | 707/823 |
| 2011/0238905 A1* | 9/2011 | Amir et al. | 711/111 |
| 2011/0238906 A1* | 9/2011 | Amir et al. | 711/111 |
| 2012/0079289 A1* | 3/2012 | Weng et al. | 713/193 |
| 2012/0084524 A1* | 4/2012 | Gokhale et al. | 711/162 |
| 2012/0150804 A1* | 6/2012 | Adkins et al. | 707/639 |
| 2012/0297183 A1* | 11/2012 | Mukkara et al. | 713/153 |
| 2013/0086269 A1* | 4/2013 | Bairavasundaram | G06F 9/5011 |
| | | | 709/226 |

OTHER PUBLICATIONS

Rahumed, Arthur; Chen, Henry C. H.; Tang, Yang; Lee, Patrick P.C.; Lui, John C.S.; "A Secure Cloud Backup System with Assured Deletion and Version Control", 40$^{th}$ International Conference on Parallel Processing Workshops, IEEE, Sep. 13-16, 2011, pp. 160-167.*

Sun, Kyoungmoon; Choi, Jongmoo; Lee, Donghee; Noh, Sam H.; "Models and Design of an Adaptive Hybrid Scheme for Secure Deletion of Data in Consumer Electronics", IEEE Transactions on Consumer Electronics, vol. 54, Issue 1, Mar. 12, 2008, pp. 100-104.*

* cited by examiner

| Indentifier | Location | Random Key |
|---|---|---|
| Indentifier 1 | Storage Location 1 | Random Key 1 |
| Indentifier 2 | Storage Location 2 | Random Key 2 |
| . | . | . |
| . | . | . |
| . | . | . |
| Indentifier n | Storage Location n | Random Key n |

Index
200

SYSTEM AND METHOD FOR SECURE DELETION OF DATA

BACKGROUND

A storage system may comprise one or more devices configured to store data. The devices may be, for example, disk drives, flash memory, phase change memory (PRAM) and/or a non-volatile memory device configured to maintain the data when power is off. As an example of a storage system, a personal computer may have a disk drive configured to store data such as applications, files and/or configuration data. In addition, a flash memory and/or PRAM may be coupled to the processor in the personal computer. Other examples of storage systems are RAID storage arrays and network based storage services, such as cloud-based storage. The data stored in a storage system may be managed by storing metadata corresponding to the data item in an index. The metadata entries may include the physical location of the corresponding data item in order to easily identify and locate the data within the file or storage systems.

Deleting data is a desired operation in storage systems for many applications. For example, in some file systems, data is deleted by marking a metadata entry in the file system index to indicate the data as deleted. To securely delete the data, the physical storage locations for the data in the drives or memory of the storage system is overwritten with a bit pattern. Otherwise, the data may be recoverable.

When overwriting the data, additional overhead is incurred for secure deletes as I/O resources on the data storage device(s) are consumed during overwrites of the data to be deleted. For slow media such a tape drives, this additional overhead can tie up an I/O device and create delays within the system. In addition, when overwriting the data, adjacent data may experience write disturbance in some media types. For example, some types of media (e.g., shingled magnetic recording drives) do not efficiently support precision overwrites where nearby data might be destroyed or destabilized. Furthermore, in some memories such as flash that specify the number of read/write cycles recommended for the lifetime of the flash, overwriting data may contribute to a reduction in lifetime for the memory.

BRIEF DESCRIPTION OF THE DRAWINGS

FIG. 2 illustrates the elements in an index, according to one embodiment.

Figure 1:
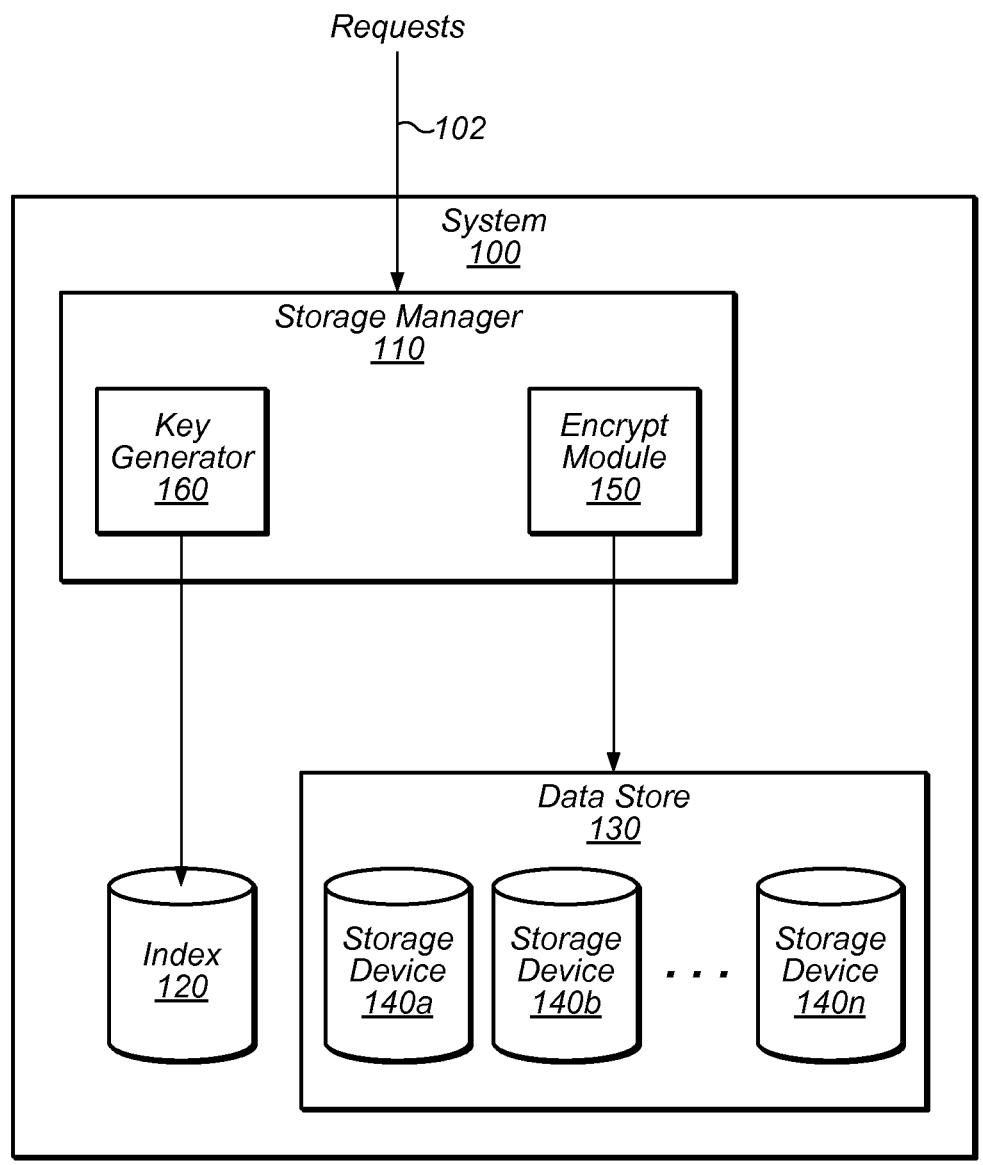
FIG. 1 illustrates a system that supports secure delete of data items from a data store, according to one embodiment.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

Systems and methods are described herein for providing secure deletion of data in a system. For example, to facilitate a subsequent secure delete operation, an encryption module in a storage manager may encrypt a data item in response to a request to store the data item in a data store. Also in response to the request to store data in a data store, a key generator in the storage manager may generate a random key that may be used to decrypt the data. The encrypted data item may be stored in one or more storage devices of a data store in the system. The storage manager may also store the location of the encrypted data and the random key generated for the encrypted data in an index. The index may include one or more metadata entries corresponding to each data item stored in the storage devices of a data store. In response to a read request from a client, the storage manager may access the index to locate the requested data item and obtain the corresponding key, read the encrypted data item from the data store, use the key to decrypt the data item, and transmit the decrypted data item to the client. A secure delete request for a specific data item may be performed by locating the metadata entry in the index corresponding to the data item and removing the random key. When the secure delete is complete, the encrypted data may remain in the data store. In other words, the delete operation may be performed without accessing or overwriting the data to be deleted in the data store. Since the decryption key has been removed from the index and is no longer available, the corresponding encrypted data in the data store is effectively and securely deleted.

Secure deletion of data items in a data store may be used, for example, in applications where sensitive data must be protected. In network based storage systems, clients may be banking, credit card service, retail service or other entities with data to be protected. In addition, the storage resources in the data store may be reused therefore it is desirable to securely delete data so that it is not recoverable. The secure deletion technique described herein may avoid overhead of accessing the data (e.g., CPU cycles, I/O resources) to overwrite blocks of data on storage devices.

As an example, in response to a request to delete a data item in a data store, the storage manager may access the index to locate the metadata entry corresponding to the data item to be deleted. Once located, the random key corresponding to the metadata entry may be deleted. Since the data is stored in encrypted form, without the random key, the data may not be decrypted. Therefore, to perform a secure delete without accessing the data item in the data store, the storage manager may simply remove the random key from the metadata entry in the index and leave the encrypted data item in the data store. In some embodiments, the secure delete operation for a particular data item is performed without accessing the particular data item in the data store. However, the storage space in the data store occupied by the deleted data item may be available for re-use and may eventually be overwritten.

To store a data item, the storage manager may be configured to generate a random key in a key generator. The storage manager may be further configured to encrypt the data item in an encryption module. The encrypted data item may be stored in the data store and the random key may be stored in a metadata entry in an index. The metadata entry in the index corresponding to the data item may include, but is not limited to, details about the data item such as physical location in memory, the name of the data file and/or access permissions.

In addition, in some embodiments, the data store may be configured as a multi-client network storage system providing storage services for multiple clients over a network, such as a web services based cloud storage service. In a multi-client network storage system the data store may be configured to store a plurality of data items for a plurality of clients in respective client volumes or objects. The client volumes or objects may comprise one or more files and the files may subsequently be divided into blocks. The secure delete technique described herein may be provided at each level of a storage management hierarchy (e.g., object, file, block). For example, data for a client objects may be encrypted and a corresponding random key stored in a client object index. The secure delete technique may also be applied at a file system level such that client files may be encrypted and have their corresponding keys stored in a file system index. In addition, the blocks of data comprising the files may be encrypted and their corresponding random keys stored in a block level index.

In some embodiments, it may be necessary to remove a data item from the system. The data item may include sensitive information about a business (e.g., product plans) and/or customer information (e.g., credit cards, social security number etc) for example. A businesses data store may comprise data items in a variety of formats. For example, a client's portion of a data store may include multiple volumes, files and blocks of data distributed over one or more locations. A variety of factors may determine the amount of data to be deleted and may further determine whether a client volume, a client file or a client block may be deleted. For example, in the hierarchy described above, deleting a client volume may also delete the files and blocks of data that comprise the volumes.

For example, a delete request may occur at either the volume, file and/or block level. In response to a client volume delete request, for example, the storage manager may delete the random key for the client volume from the metadata entry in the client volume index. Removing the client volume random key may be an efficient, secure method for deleting an entire client volume and all of the contents in the client volume without having to access the data of the client volume. Alternatively, in some embodiments, the delete request may be a block delete request. In response to a block delete request, one or more blocks of data in the client volume may be deleted by removing the random key from the metadata entry in the block level index corresponding to the block to be deleted.

FIG. 1 illustrates a system that supports secure delete of data items from a data store, according to one embodiment. Generally speaking, system 100 may be any computing device or system that stores data. For example, system 100 may be a file server, a database system, a network-based storage system, a personal computer, a handheld device, a smart phone, a tablet computing device, or any other electronic device storing data. For example, in some configurations, system 100 may act as a resource for a client to store backup data off the client site to preserve critical information in the case of hardware failures at the customer site. The data store may be geographically and logically separate from a client. The client may access their data via a public network (e.g., Internet). In addition, the data store may be located at the client site as may be found in a personal computer with a disk drive. The storage resources may be configured for multiple applications such as banking, credit services, retail services and/or web-based services requiring logins. Although each of these applications is different, they each may have a need for secure deletion of data. For example, the retail services site utilizing the network based storage resource may temporarily store credit card information and/or other information corresponding to the purchase. The information may be stored for a certain period of time until the purchase is complete for example and then the retail service may delete the data. A secure system and method for deleting the data may be a critical aspect of protecting consumer data. The components of system 100 that perform these tasks are described in more detail below.

System 100 may be configured to receive requests 102 from a single client or multiple clients. System 100 may further comprise multiple components to manage data items in data store 130. For example, system 100 may further include storage manager 110 configured to manage the data items and data requests 102 received from a client. Storage manager 110 may also comprise a key generator 160 and an encryption module 150 configured to provide an encryption algorithm for the data items. In some embodiments, there may be multiple clients in a network sharing data store 130. There may be network administrators that manager the shared resources. In some embodiments, network administrative personnel or other users may have the option to choose the encryption algorithm performed by encryption module 150. In some embodiments, network administrative personnel or other users may have the option to choose to bypass the encryption module 150 to save compute time or if the data item does not need a secure delete option.

Key generator 160 may be configured to generate a random key that may be used to decrypt a data item stored in data store 130. The key generator may comprise hardware and/or software configured to generate the random key. The key length (e.g., the size measured in bits) may be an indicator of strength of the encryption. An example of key length is a 128-bit key, which has $2^{128}$ possible combinations making it very difficult to decipher. In some embodiments, the key generator may be configured to offer a selection of key lengths to allow a client to select a key strength for their respective data items. In addition, the key length may be dependent on the encryption algorithm chosen. An example algorithm is the Advanced Encryption Standard (AES) that has been adopted by the U.S. government. AES may be implemented in software and/or hardware with different key sizes. AES may utilize one or more rounds of shifting, rotating, exclusive or-ing, or mixing columns of data, for example, to encrypt the data items. AES typically utilizes key lengths of 128 bits, 192 bits and/or 256 bits.

Another example of an encryption algorithm is secure hash algorithm (SHA) designed and published by the National Institute of Standards and Technology (NIST). The SHA algorithm converts a block of data into a fixed-size bit string. The fixed-size bit string may be typically called a digest. In the SHA2 algorithm, for example, 224 bits, 256 bits, 384 bits and/or 512 bit digests or keys may be allowed.

Encryption module 150 may be configured to encrypt a data item received from a client using, for example, one of the algorithms described above. In addition, encryption module 150 may be comprised of hardware and/or software to implement the selected algorithm. Encryption module 150 may be further configured to encrypt data with a symmetric or asymmetric encryption algorithm. Symmetric encryption utilizes one key to encrypt and decrypt a data item. Asymmetric encryption utilizes one key to encrypt and one key to decrypt a data item. As discussed above, the key length may differ depending on the strength of the encryption required or the encryption algorithm chosen. The encryption key randomly generated by key generator 160 may be stored in index 120 for later use. In some embodiments, if the encryption algorithm used is asymmetric, both keys may be stored in index 120. In other embodiments, only the decryption key is stored in index 120 and the encryption key is not retained. The key from index 120 may be used during a read request to decrypt the data item prior to sending the data item to the client. A secure deletion of the data item may be performed by removing the key from index 120. This will be described in further detail below.

Storage manager 110 may store the encrypted data item in data store 130. Data store 130 may include one or more storage devices 140. Storage devices 140 may include, but is not limited to, Flash memories, PRAM, tape drives and/or one or more disk drives as depicted in FIG. 1. Examples of disk drives are optical drives and magnetic recording disk drives (e.g., traditional disk drives or Shingled Magnetic Recording disk drives). Data store 130 may be configured as a single disk drive (e.g., optical, magnetic), multiple disk drives (e.g., RAID) and/or as a network based storage resource.

Generally speaking, index 120 may comprise information mapping each entry to a respective data item in storage. During a read, write and/or delete operation, index 120 may be accessed to locate attributes of the data item prior to completing the operation. The attributes (e.g., metadata) may include, but are not limited to, location in physical memory, permissions, file type, and/or decryption keys.

The random key generated by key generator 160 may be stored in a metadata entry in index 120. As described above, metadata entries, not explicitly shown, may include, but is not limited to, identifiers, location information, random keys or any other data mapping the entry to a respective data item in storage devices 140 of data store 130. The identifiers may be names of the data items that are visible to a client. The location information may be physical or logical locations for the data item in storage devices 140. The random key may be the key that is used to decrypt the data. In other embodiments, instead of storing the random key generated by key generator 160 in a metadata entry in index 120, the random key may be stored as metadata along with the corresponding data item(s) in data store 130.

In response to a store request, storage manager 110 may determine a storage location for the data item. The storage manager 110 may also encrypt the data item and determine a random key operable to decrypt the data item. The identifier corresponding to the data item, the storage location and the random key may be stored in a metadata entry in the index 120. As another example, in response to a read request for the same data item, the metadata entry in the index corresponding to the data item may be accessed to determine the storage location of the data. In response to the read request, the random key corresponding to the data item may be used to decrypt the data item prior to sending the decrypted item to the client. Additionally, in response to a delete request for the data item, the storage manager 110 may determine the metadata entry corresponding to the data item and remove the random key from the metadata entry of index 120. Without the random key the data item cannot be decrypted. Thus, the data item is securely deleted.

FIG. 2 illustrates the elements in an index 200, according to one embodiment. Index 200 may be an example of index 120 of FIG. 1. The index may be a mapping of a data item to location, and other metadata corresponding to the data item. The index may be accessed during stores, reads or deletes of a data item to determine pertinent information about the data item such as the location. The index may also include other metadata for data items, such as identifiers, access control information, permissions, file type, etc. The location of the data item in storage listed in the metadata entry may provide a pointer to a physical location (e.g., disk number, physical address in a storage resource). The location information may be used to retrieve and store data. One example of an index is the Windows based file system Master File Table. Another example is an inode file. Inodes are a data structure often identified by an integer number to represent attributes of a file or directory. The attributes may include details of the data item represented by the inode, including, but not limited to, permissions for file accesses, file ownership and/or file type.

In this embodiment, index 200 comprises three elements for each of the one or more metadata entries, although there may be more or less elements in index 200 as discussed above. Index 200 may comprise other information corresponding to a data item and/or have other attributes. Identifier 210 may be a label assigned by the client or a file system to a data item to be stored in the data store. One example of identifier 210 is the file name as found in a Master File Table (MFT) common to Windows based file systems. Another example of identifier 210 is an inode identifier, which may be found in Unix or Linux based system.

Location 220 in index 200 may be a simple address representing the location of the data item in the data store. The location information in larger systems may be more complex. For example, in a multi-disk system, location 220 may comprise a disk number and then an offset representing which block of the disk to store and/or locate the data item. Random key 230 may be the key as described in FIG. 1 that is used to decrypt the corresponding data item. In alternate embodiments, location 220 may be stored separately from the metadata entry comprising random key 230 and identifier 210.

As an example, a delete request may be received by system 100 depicted in FIG. 1 for a data item corresponding to an identifier (e.g., identifier 1) in index 200. To process the delete request, index 120 may be read to locate the metadata entry for an identifier (e.g., identifier 1). The same metadata entry may comprise an entry in location 220 and random key 230. Once the appropriate metadata entry is located, the random key 230 (e.g., key 1 corresponding to identifier 1) may be removed to complete the delete operation. In this embodiment, the data was securely deleted although location information was not used to physically delete or overwrite the data corresponding to the identifier in the data store. Since the random key is removed, the data may no longer be decrypted and thus the data is securely deleted. This may be an efficient, secure process that does not tie up input/output (I/O) resources that would normally occur during an over-write and/or delete of data in the data store.

Figure 3:
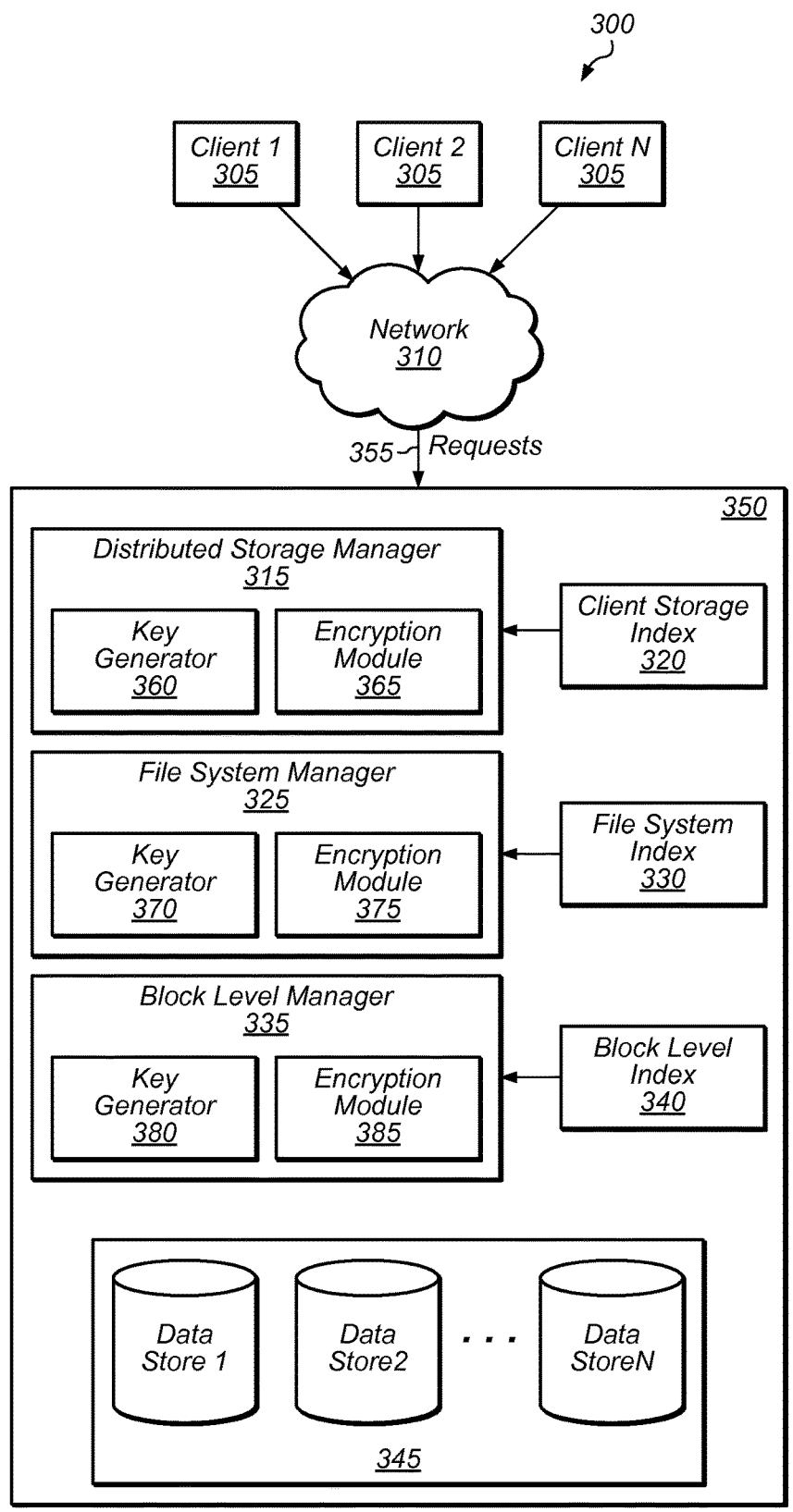
FIG. 3 illustrates an example of a data store configured as a multi-client networked storage system, according to one embodiment.

FIG. 3 illustrates an example of a data store configured as a multi-client networked based storage system, according to one embodiment. System 300 depicts components of the configuration depicted in FIG. 1 as applied to a multi-client network. An example of a multi-client network is cloud computing. In a cloud computing system, each client may store data objects in a distributed data store. Each client may also run different, sometimes proprietary, file systems. In addition, each client object may be intended for a unique application. For example, a client may be a banking or credit card service, a web hosting service or a small business entity needing a backup storage resource. To manage the multiple data items, there may be storage managers at multiple points in a data store hierarchy. For example, there may be a storage manager to manage the client objects, a storage manager to manage file systems, and block managers to manage the blocks of data within the file systems and/or objects. At each level of the hierarchy, the data items may be encrypted and their decryption key stored in a corresponding index, as described in FIGS. 1 and 2, corresponding to each storage manager. In the embodiment depicted in FIG. 3, multi-client system 300 may comprise multiple indexes, such as those depicted in FIG. 2, to store metadata for client objects, file systems and/or blocks.

In the example multi-client networked storage system depicted in FIG. 3, each client 305 may be coupled to storage system 350 via network 310. Client 305 may be a business enterprise, an educational entity, a government entity or a private entity coupled to an intermediate network 310 such as the Internet, to provide networked computing services to one or more clients. In some embodiments, system 350 may provide an interface, for example a Web service interface, via which each client's network(s) may access functionality provided by storage system 350.

Storage system 350 may comprise the components as illustrated in FIG. 1, but due to the complexity of multi-client system 300, system 350 may be divided into one or more levels. At the first level, distributed storage manager 315 may manage storage of client objects for system 350 into client storage 345. As discussed above, a client object may include data unique to the client's business or application. Client object may be stored within a distributed storage system 345. Client storage index 320 may comprise one or more metadata entries representing each of the client objects in system 350. The metadata entries in client storage index 320 may comprise the identifier 210, location 220 and random key 230 information corresponding to each of the client objects as described in FIG. 2. Distributed storage manager 315 may be configured to allow a client or system administrator to choose the type of encryption (e.g. SHA-1, MD5, etc) for the client object applied when data is stored to the client object. Key generator 360 (e.g., similar to key generator 160 in FIG. 1) may generate the random key corresponding to the encryption algorithm and store the key in client storage index 320. In some embodiments, the random key is used to decrypt the data item in a client object during read requests. As discussed above in FIG. 1, key generator 360 may comprise hardware and/or software configured to generate the random key. In some embodiments, the key generator may be configured to offer a selection of key lengths to allow a client or system administrator to select a key strength for their respective data items. In addition, the keys may be generated randomly so that no pattern of keys may be used to determine the decryption key of a deleted data item.

As discussed above in FIG. 1, encryption module 365 (e.g., encryption module 150 in FIG. 1) may be comprised of hardware and/or software to encrypt the data item to be stored. Encryption module 365 may be further configured to encrypt data with a symmetric or asymmetric encryption algorithm. Symmetric encryption utilizes one key to encrypt and decrypt a data item. Asymmetric encryption utilizes one key to encrypt and one key to decrypt a data item. As discussed above, the key length may differ depending on the strength of the encryption required. In addition, the key may be stored in a metadata entry in an index to be used when storing, deleting or reading the data, but the encryption and/or decryption in conjunction with the random key may be invisible to the client.

File system manager 325 may be configured to manage details of individual files in distributed data store 345. An identifier and location of the files in the file system may be stored in file system index 330. In addition, key generator 370 may provide a random key and encryption module 355 that may encrypt the files and store the key in a metadata entry in file system index 330 as described above. In some embodiments, the encryption of each of the files is separate from the client object encryption. This may provide for a secure delete at multiple levels.

In addition, as illustrated in this embodiment, block level manager 335 may be present in storage system 350. Block level manager 335 may determine the storage location of data in the data store. As discussed above in FIG. 1, the data store may be configured with one or more memory resources (e.g., Flash memory, PRAM or disk drives). The identifier and location, as described in FIG. 2, of the blocks of data may be stored in a metadata entry in block level index 340. Encryption module 385 and key generator 380 may be used to encrypt the blocks of data and determine a random key as described above. The random key may also be stored with the identifier and location information in the metadata entry of block level index 340. In some embodiments, the random key associated with the blocks of data may be separate from the file system key and the client object key.

In addition to providing security of the data stored in individual client volumes, objects, files and/or blocks, the random keys may be used to provide a secure method for deleting data items from a data store. For example, if request 355 is a client object delete request, then distributed storage manager 315 may determine the metadata entry in client storage index 320 corresponding to the client object to be deleted. Distributed storage manager 315 may then remove the random key and/or over-write the metadata entry corresponding to the client object to be deleted. It may be noted that the location information of the client object from the metadata entry was not needed to access the actual data of the object to perform the delete. The client object may remain encrypted in the data store, but without the random key, the client object can not be decrypted. Thus the object may be securely deleted without over-writing or removing the data items from data store 345. In some embodiments, since the data may be separately encrypted at each level, an entire object may be deleted by removing the corresponding key in client object index 320 without removing keys the keys for files or blocks included in the object from the file system index 330 or block level index 340.

As an alternate example, if request 355 is a block level delete request, distributed storage manager 315 may utilize the metadata in client object index 320 to locate the particular object containing the block of data. The distributed storage manager 315 may send the delete request to the appropriate block level manager 335. Block level manager 335 may determine the metadata entry in block level index 340 corresponding to the block to be deleted. Block level manager 335 may then remove the random key and/or over-write the metadata entry corresponding to the block to be deleted. The block of data (encrypted) may remain in the data store, but without the random key, the block of data can no longer be decrypted and its contents accessed. However, the storage resources occupied by the block of data may become available for re-use and may eventually be over-written. Note that in performing a block level delete, the corresponding keys in the file system index 330 and client storage index 320 remain untouched since the file and volume corresponding to the deleted data may include other data that is not deleted.

In some embodiments, in response to a storage request for a data item, the following may occur. The distributed storage manager may locate the client object for the data. The data item is encrypted at the client object level and the corresponding key stored in the storage index (if not already there). The file system manager may then determine a storage location for the encrypted data item and further encrypt the encrypted data item at the file system level, storing the corresponding key in the file index (if not already there). The block system manager may determine the physical location(s) of one or more blocks for the now doubly encrypted data item, and encrypt each block of data and store the locations and/or decryption key in the block index. Thus, a given data item may be separately encrypted at each level of a storage hierarchy, such as at a object level, file level, and block level. Correspondingly, the secure delete operation may be supported at each such level.

In some embodiments, in response to a read request for a data item (e.g., file), the client volume index is used to determine the location of the client object and the corresponding decryption key. The file system index may then be accessed to determine the file location and the corresponding file level decryption key. Lastly, the block index may be used to determine the location for the blocks of data associated with the file to be read. The random keys in the block index corresponding to the block of data to be read may be utilized to decrypt the data item. The data item may then be decrypted at the file and volume levels. The decrypted data item may then be transmitted to the client (e.g., read requestor).

Figure 4:
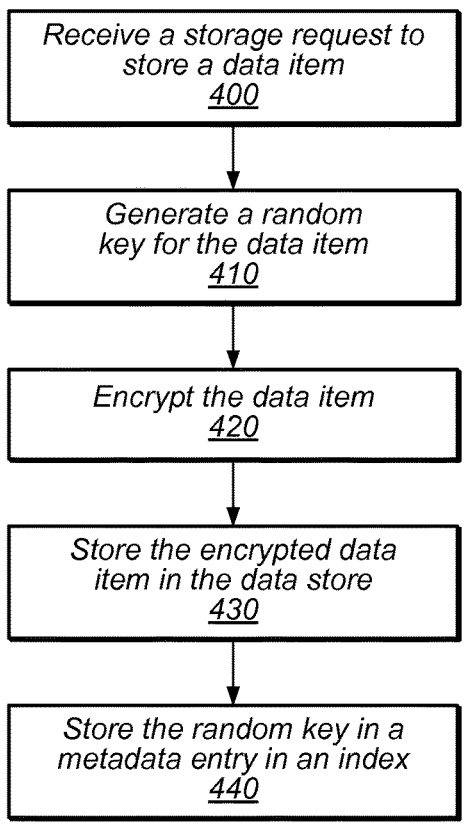
FIG. 4 is a flow diagram illustrating a method for storing encrypted data items, according to one embodiment.

FIG. 4 is a flow diagram illustrating a method for storing data items of any size or at any level in a system, according to one embodiment. Generally speaking, a storage manager of a data store may receive a request to store a data item in a data store. In response to the storage request, the data item may be encrypted and have a random key generated useable to decrypt the data item. The random key and location of the data item may be stored in an index for later use during a read request. The data items to be stored may be of any size. In addition, the data item may include, but is not limited to, one or more blocks of data, one or more files, and/or one or more client volumes or objects as shown in FIG. 3. As an example only, a storage system may be utilized as a storage service for web hosting services. After a client updates web pages, the client may wish to store the web page (e.g., data item) in the data store for access by customer of the web hosting service. The method to store a data item in a data store may be as described below.

As indicated in 400, a storage request to store a data item may be received. A data item may be a block of data or a client object, for example. As indicated in 410, a random key may be generated for the data item. The random key may be generated as described in FIG. 1. As indicated in 420, the data item may be encrypted using an algorithm such as the ones described above. As discussed for FIG. 1, the algorithms may encrypt data with a symmetric or asymmetric encryption algorithm. As discussed above, the key length may differ depending on the strength of the decryption required.

As indicated in 430, the encrypted data item may be stored in the data store, and as indicated in 440 the random key may be stored in a metadata entry in an index or with the encrypted data in the data store. In addition, the location of the data item in the data store may be stored in the metadata entry of the index. In some embodiments, there may be multiple indexes representing different levels or points within the data store. For example, a multi-client networked storage resource may require separate client objects to protect client's data. At the user object level, there may be an index storing the metadata corresponding to each client object. Within each of the individual client objects there may be one or more data items (e.g., blocks). The data items in each client object may also be encrypted and require indexes to track the keys and other metadata information corresponding to the encrypted data items.

Figure 5:
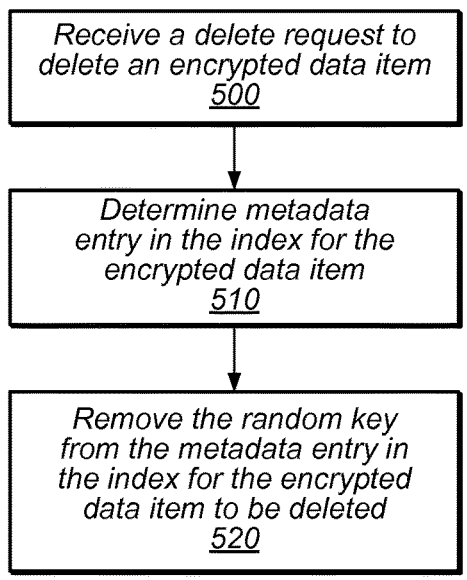
FIG. 5 is a flow diagram illustrating a method for securely deleting encrypted data items, according to one embodiment.

FIG. 5 is a flow diagram illustrating a method for securely deleting encrypted data items, according to one embodiment. For example, a client may be a banking or credit card service that manages a large amount of sensitive customer information. Either entity may store the customer information for a pre-determined amount of time. At the end of the pre-determined time period, they may wish to delete the customer information. Given the large amount of data they manager, it is inefficient to utilize compute resources to deleted or overwrite the customer information. Instead, the client may simply remove the random key(s) in the index corresponding to the customer information to be deleted. Without the random key, the customer information cannot be decrypted and is thus effectively deleted. Thus, the customer information may be securely deleted in one simple procedure. The delete is secure because even if the data is retrieved from the data storage, the data is encrypted. Since the decryption key has been removed, the data is no longer recoverable. The method may proceed as described below.

As indicated in 500, a delete request to delete an encrypted data item may be received by a storage manager. As indicated 510, a storage manager may determine the metadata entry in the index for the encrypted data item. As indicated 520, the random key in the metadata entry corresponding to the encrypted data item to be deleted may be removed from the index. In some embodiments, the entire metadata entry may be removed. In other embodiments, only the random key is removed and the data item is marked as deleted in the metadata entry in the index. In some embodiments, the random key or entire metadata entry is overwritten (e.g., with all 1's or all 0's or other bit pattern) to ensure removal of the random key. When the random key is removed from the index, the corresponding data item cannot be decrypted. This allows for a secure delete of the data item without having to delete or over-write the encrypted data item in the data store. In embodiments in which the random key is stored with the encrypted data instead of within the index, the storage location of the random key would be determined at 510, and the random key would be deleted (and possibly overwritten) at 520. Only the random key need be deleted—the encrypted data may remain in the data store. Once the random key has been deleted, storage locations for the encrypted data may be marked for subsequent re-use.

Figure 6:
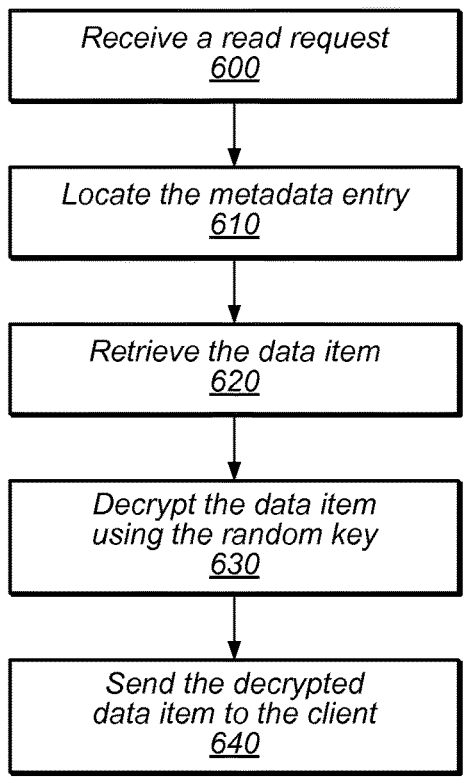
FIG. 6 is a flow diagram illustrating a method for reading encrypted data items, according to one embodiment.

FIG. 6 is a flow diagram illustrating a method for reading an encrypted data item, according to one embodiment. Generally speaking a client may request a data item from the data store. The data item may be encrypted and a storage manager may decrypt the data item using the random key in the index before sending the requested data item to the client. As discussed above, an example embodiment of a data item may be web pages for a web hosting service. A client may request access to the web page via the Internet and in response to the request a storage manager may execute the method described below.

As indicated in 600, a storage system may receive a read request to read one or more of the plurality of data items stored in the data store. As indicated in 610, the storage manager may locate the metadata entry for the data item in the index. As discussed above in FIG. 2, the metadata entry may include location information and a random key. The location information in the index may describe the physical location of the data item in the data store. In alternate embodiments, the location may be a logical location of the data item that may be further mapped to a physical address by the storage manager. As indicated in 620, the storage manager may retrieve the data item from the location indicated in the metadata entry in the index. In embodiments in which the random key is stored with the data item in the data store, instead of obtaining the random key at 610, the random key may be obtained when the data item is retrieved at 620. As indicated in 630, the storage manager may decrypt the data item using the random key stored in the index. After completing the decryption, the storage manager may send the decrypted data item to the client.

Figure 7:
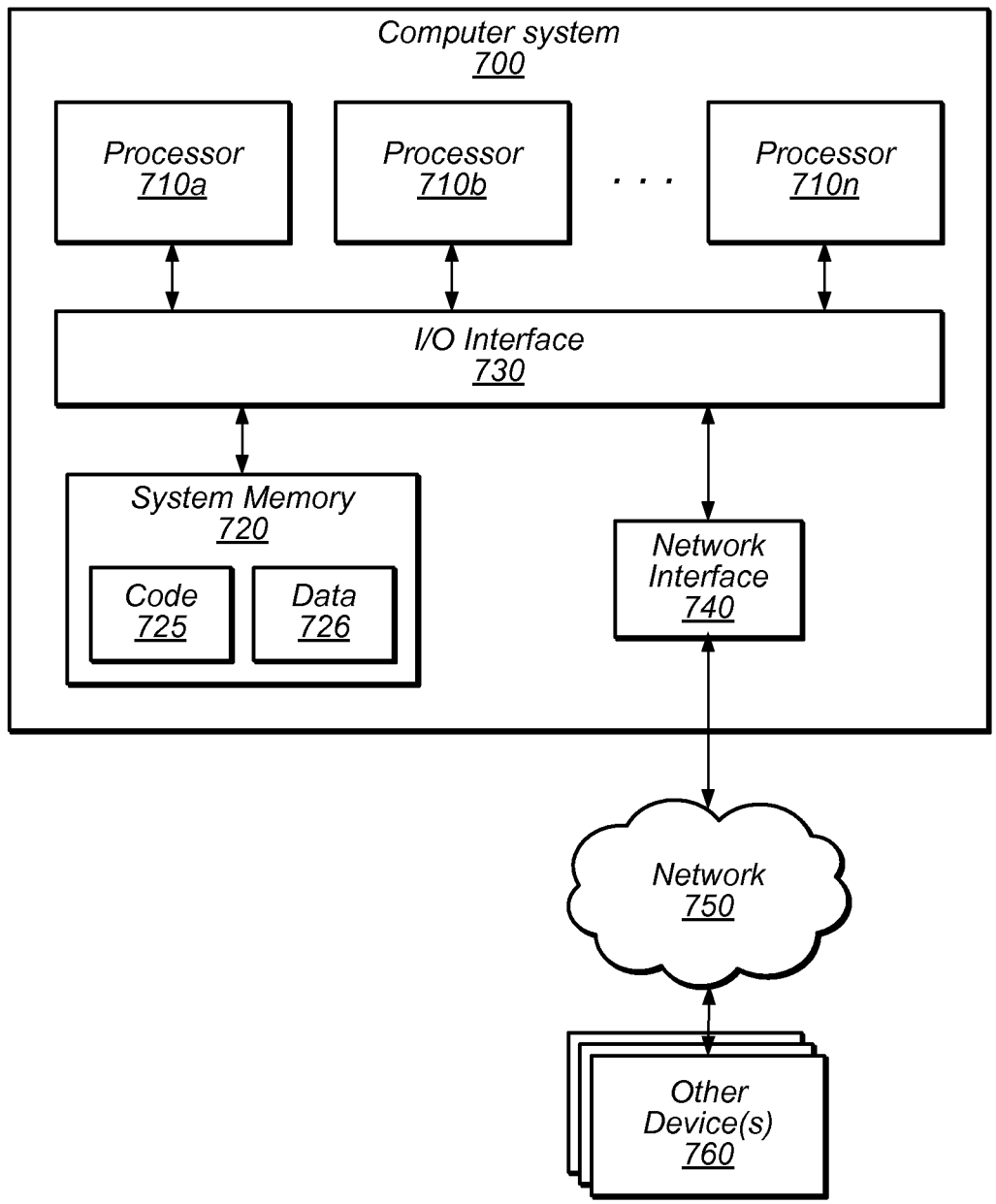
FIG. 7 illustrates one embodiment of a computer system that supports secure delete of data items, as described herein.

FIG. 7 illustrates one embodiment of a computer system that supports secure delete of data items, as described herein. In at least some embodiments, a computer system that implements a portion or all of one or more storage system technologies as described herein, may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uni-processor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for secure storage and deletion of data items, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in the other Figures described herein, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above in reference to the other Figures for implementing embodiments of storage gateway technologies. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of networked storage devices of a cloud-based storage service that implement a data store configured to store encrypted data, wherein the plurality of networked storage devices is connected via a storage service network;
a separate index for each of at least two levels of a storage hierarchy for the data store, wherein each index is configured to store a plurality of metadata entries for the encrypted data stored across the plurality of networked storage devices, wherein each metadata entry is for a different data item in the data store, and wherein each metadata entry comprises an identifier, location information and a random encryption key; and
a hierarchical storage manager connected to the networked storage devices via the storage service network and configured to receive, via a web services interface and over an intermediate network, a storage request to store a data item, wherein in response to the storage request, the storage manager is configured to:
generate a random key for the data item at a first level of the storage hierarchy;
encrypt the data item, wherein the random key is usable to decrypt the encrypted data item at the first level of the storage hierarchy;
generate one or more different random keys for one or more portions of the data item at a second level of the storage hierarchy;
encrypt the respective one or more portions of the encrypted data item, wherein the one or more different random keys are usable to decrypt the respective one or more encrypted portions of the encrypted data item at the second level of the storage hierarchy;
store the respective one or more encrypted portions of the encrypted data item over the storage service network to one or more of the networked storage devices of the data store; and
store the random key in a metadata entry in an index for the first level of the storage hierarchy and store the one or more different random keys in respective metadata entries of an index for the second level of the storage hierarchy;
wherein the storage manager is further configured to receive a delete request over the intermediate network to delete, at a specified level of the storage hierarchy, one or more of a plurality of data items stored in the data store, wherein in response to the delete request, the hierarchical storage manager is configured to:
access the corresponding metadata entry in the index for the specified level of the storage hierarchy to remove at least the random key from the corresponding metadata entry in the index for each of the data items to be deleted at the specified level of the storage hierarchy, wherein after the delete request is complete:
the encrypted data for the one or more data items requested to be deleted remains on the networked storage devices that implement the data store, and
one or more random keys, corresponding to the one or more data items requested to be deleted, in an index for another level of the storage hierarchy not specified in the delete request remain in respective metadata entries.

2. The system of claim 1, wherein the storage manager further comprises an encryption module configured to generate the random key for the data item at the first level of the storage hierarchy; and wherein the encryption module is further configured with an interface for receiving input for selecting one of a plurality of encryption algorithms to be used for encrypting a given data item.

3. The system of claim 1, wherein the system is further configured as a multi-client network based storage system,
wherein the multi-client network based storage system is configured to store a plurality of data items for a plurality of clients,
wherein for the first level of the storage hierarchy the plurality of data items for each of the plurality of clients is stored in a respective client object,
wherein the index for the first level of the storage hierarchy is a client object index,
wherein each metadata entry of the client object index corresponds to a different client object, and
wherein the random key in each metadata entry of the client object index is used to decrypt the corresponding client object.

4. The system of claim 3, wherein the multi-client network based storage system is further configured to, in response to an object delete request:
remove at least the key from the metadata entry in the client object index for one or more of the client objects to be deleted,
wherein after the client object delete request is complete, the encrypted one or more client objects remain in the data store.

5. The system of claim 1, wherein the system is further configured to store each data item received for a particular client volume in a block level storage that corresponds to the second level of the storage hierarchy,
wherein the index for the second level of the storage hierarchy is a block level index,
wherein each metadata entry in the index for the second level of the storage hierarchy corresponds to a different block, and
wherein the random key in each metadata entry in the index for the second level of the storage hierarchy is used to decrypt the corresponding block.

6. The system of claim 1, wherein the separate indexes are stored on one or more devices that are distinct from the networked storage devices storing the encrypted data.

7. A system, comprising:
one or more processors; and
a memory coupled to the one or more processors and storing program instructions that when executed by the one or more processors implement a storage manager configured to:
receive, by a cloud-based storage service over an intermediate network, a storage request to store a data item in a data store having a storage hierarchy, the data store implemented by one or more networked storage devices of the cloud-based storage service, wherein the one or more networked storage devices are connected via a storage service network;
generate, by the cloud-based storage service, a random key for the data item at a first level of the storage hierarchy;
encrypt, by the cloud-based storage service, the data item, wherein the random key is usable to decrypt the encrypted data item at the first level of the storage hierarchy;
generate one or more different random keys for one or more portions of the data item at a second level of the storage hierarchy;

encrypt the respective one or more portions of the encrypted data item, wherein the one or more different random keys are usable to decrypt the respective one or more encrypted portions of the encrypted data item at the second level of the storage hierarchy;

store, by the cloud-based storage service, the respective one or more encrypted portions of the encrypted data item over the storage service network to the one or more networked storage devices of the data store;

store the random key in a metadata entry of an index for the first level of the storage hierarchy and store the one or more random keys in respective metadata entries of an index for the second level of the storage hierarchy, wherein the indexes are configured to store a plurality of metadata entries for the encrypted data stored in the one or more networked storage devices; and in response to receipt of a delete request over the intermediate network to delete, at a specified level of the storage hierarchy, one or more of a plurality of data items stored in the data store:

access the corresponding metadata entry in the index for the specified level of the storage hierarchy to both modify the corresponding metadata entry, and remove the random key from the corresponding metadata entry in the index for each of the data items to be deleted at the specified level of the storage hierarchy, wherein after the delete request is complete:

the encrypted data for the one or more data items requested to be deleted remains on the networked storage devices that implement the data store and one or more random keys, corresponding to the one or more data items requested to be deleted, in an index for another level of the storage hierarchy not specified in the delete request remain in respective metadata entries.

8. The system of claim 7, wherein said store the random key in a metadata entry for the first level of the storage hierarchy further comprises store the random key in the index for the first level of the storage hierarchy, the index comprising a plurality of metadata entries, wherein each metadata entry is for a different data item in the data store, and wherein each metadata entry comprises an identifier, location information and a random encryption key.

9. The system of claim 7, wherein said remove the random key from the index for each of the data items to be deleted comprises over-write the key in each metadata entry for each of the data items to be deleted.

10. The system of claim 7, wherein the data store comprises a Flash memory, Phase Change Memory (PRAM), magnetic hard disk drive, tape disk drive or optical disk drive.

11. The system of claim 10, wherein the magnetic hard disk drive is further configured as a Shingled Magnetic Recording hard disk drive.

12. The system of claim 7, wherein the program instructions when executed by the one or more processors cause the one or more processors to:

receive a read request to read one or more of the plurality of data items stored in the data store;

locate the metadata entry for the data item in the index; and decrypt the data item using the random key stored in the index.

13. The system of claim 7, wherein the indexes are stored on one or more devices that are distinct from the one or more networked storage devices that store the encrypted data.

14. The system of claim 7, further comprising mark for re-use one or more locations in the data store storing the encrypted data for the one or more data items requested to be deleted.

15. The system of claim 7, wherein said store the random key in a metadata entry further comprises store the random key with the encrypted data item in the data store.

16. A method, comprising:

performing, by one or more computers:

receiving, over an intermediate network by a cloud-based storage service, a storage request to store a data item in a data store having a storage hierarchy, the data store implemented by a plurality of networked storage devices of the cloud-based storage service, wherein the plurality of networked storage devices is connected via a storage service network; and in response to said receiving:

generating a random key for the data item at a first level of the storage hierarchy;

encrypting the data item, wherein the random key is useable to decrypt the encrypted data item at the first level of the storage hierarchy;

generate one or more different random keys for one or more portions of the data item at a second level of the storage hierarchy;

encrypt the respective one or more portions of the encrypted data item, wherein the one or more different random keys are usable to decrypt the respective one or more encrypted portions of the encrypted data item at the second level of the storage hierarchy;

storing the respective one or more encrypted portions of the encrypted data item over the storage service network to one or more of the plurality of networked storage devices of the data store;

accessing an index for the first level of the storage hierarchy to store the random key in a corresponding metadata entry in the first level index, and store the one or more random keys in respective metadata entries of an index for the second level of the storage hierarchy, the indexes configured to store a plurality of metadata entries for the encrypted data stored in the plurality of networked storage devices, wherein the metadata entries in the indexes comprise an identifier, location information and the random key for the data item;

receiving a delete request over the intermediate network to delete, at a specified level of the storage hierarchy, one or more of a plurality of data items stored in the data store, wherein the plurality of data items is stored in an encrypted form in the data store; and subsequent to said receiving:

determining a metadata entry for each of the one or more of a plurality of encrypted data items from the index for the specified level of the storage hierarchy;

removing at least the random key from the metadata entry in the index for each of the data items to be deleted for the specified level of the storage hierarchy, wherein after the delete request is complete:

the encrypted data for the one or more data items requested to be deleted remains on the networked storage devices that implement the data store and one or more random keys, corresponding to the one or more data items requested to be deleted, in an index for another level of the storage hierarchy not specified in the delete request remain in respective metadata entries.

17. The method of claim 16, wherein said removing at least the random key from the metadata entry in the index for each of the data items to be deleted comprises over-writing the key for each of the data items to be deleted.

18. The method of claim 16, wherein said delete request is a client object delete request.

19. The method of claim 16, wherein said delete request is a block level delete request.

20. The method of claim 16, wherein the data store is configured as a multi-client network based storage system, wherein said storage request is a client object storage request.

21. The method of claim 16, wherein said storage request is a block level storage request.

22. The method of claim 16, further comprising:
receiving a read request over the intermediate network to read one or more of a plurality of data items stored in the data store;
in response to said receiving the read request:
locating the one or more metadata entries for the one or more data items in one or more of the indexes; and
decrypting the one or more data items using the corresponding one or more random keys stored in the one or more indexes.

23. The method of claim 16, wherein the indexes are stored on one or more devices that are distinct from the networked storage devices that store the encrypted data item.

24. A non-transitory, computer-readable storage medium storing program instructions computer executable to implement a storage manager configured to:
receive a storage request over an intermediate network by a cloud-based storage service to store a data item in a data store having a storage hierarchy, the data store implemented by a plurality of networked storage devices of the cloud-based storage service that are connected via a storage service network; and
in response to said receive the storage request:
generate a random key for the data item at a first level of the storage hierarchy;
encrypt the data item, wherein the random key is usable to decrypt the encrypted data item at the first level of the storage hierarchy;
generate one or more different random keys for one or more portions of data item at a second level of the storage hierarchy;
encrypt the respective one or more portions of the encrypted data item, wherein the one or more different random keys are usable to decrypt the respective one or more encrypted portions of the encrypted data item at the second level of the storage hierarchy;
store the respective one or more encrypted portions of the encrypted data item over the storage service network to one or more of the networked storage devices of the data store;
access an index for the first level of the storage hierarchy to store the random key in a corresponding metadata entry in the first level index, and store the one or more random keys in respective metadata entries of an index for the second level of the storage hierarchy the indexes configured to store a plurality of metadata entries for the encrypted data stored in the plurality of networked storage devices;
receive a delete request over the intermediate network to delete, at a specified level of the storage hierarchy, one or more of a plurality of data items stored in a data store;
subsequent to said receive the delete request:
determine a metadata entry for each of the one or more of a plurality of encrypted data items from the index for the specified level of the storage hierarchy, wherein the metadata entry in the index comprises an identifier and a random encryption key for the data item; and
remove at least the encryption key from the index for each of the data items to be deleted for the specified level of the storage hierarchy, wherein after the delete request is complete:
the encrypted data for the one or more data items requested to be deleted remains on the networked storage devices that implement data store, and
one or more random keys, corresponding to the one or more data items requested to be deleted, in an index for another level of the storage hierarchy not specified in the delete request remain in respective metadata entries.

25. The storage medium of claim 24, wherein the program instructions are further executable to:
select one of a plurality of encryption algorithms to be used for said encrypt the data item.

26. The storage medium of claim 24, wherein the program instructions are further executable to:
receive, over the intermediate network a read request to read one or more of a plurality of data items stored in the first level of the storage hierarchy in the data store;
in response to said receive the read request:
locate the data item in the first level index; and
decrypt the data item using the random key stored in the metadata entry of the first level index.

27. The storage medium of claim 24, wherein the indexes are stored on one or more devices that are distinct from the networked storage devices that store the encrypted data item.

* * * * *